United States Patent [19]
Williams

[11] Patent Number: 5,867,764
[45] Date of Patent: Feb. 2, 1999

[54] HYBRID RETURN GATE SYSTEM IN A BIDIRECTIONAL CABLE NETWORK

[75] Inventor: Thomas H. Williams, Longmont, Colo.

[73] Assignee: Cable Television Laboratories, Inc., Louisville, Colo.

[21] Appl. No.: 742,452

[22] Filed: Nov. 1, 1996

Related U.S. Application Data

[63] Continuation-in-part of Ser. No. 598,333, Feb. 8, 1996, which is a continuation-in-part of Ser. No. 522,630, Sep. 1, 1995.

[51] Int. Cl.$^6$ .................................................. H04N 7/173
[52] U.S. Cl. ................................................ 455/5.1; 348/12
[58] Field of Search ................................ 348/12, 10, 11, 348/13, 7; 455/5.1, 4.2, 3.1, 6.1, 6.2, 6.3; 345/327; H04N 7/16, 7/173

[56] References Cited

U.S. PATENT DOCUMENTS

| | | | |
|---|---|---|---|
| 3,750,022 | 7/1973 | Curry et al. | 455/296 |
| 3,924,187 | 12/1975 | Dormans | 455/4.2 |
| 4,002,843 | 1/1977 | Rackman | 455/5.1 |
| 4,982,440 | 1/1991 | Dufresne et al. | 455/5.1 |

OTHER PUBLICATIONS

Johanson, B.; Chamberlin B.;Gurusami, A. "HFC Return Ssytem: Management of Subscriber–Induced Noise" pp. 263–268 Society of Cable Telecommunications Engineers 1996 Conference on Emerging Technologies, Philips Broadband Networks, Inc.

*Primary Examiner*—Chris Grant
*Attorney, Agent, or Firm*—Duft, Graziano & Forest, P.C.

[57] ABSTRACT

A bi-directional cable network having a hybrid return gate system that prevents undesirable energy in the bi-directional cable network's return path from adversely effecting the entire network whether the network is operating as a contention based network, a reservation based network, or combination of contention and reservation. The hybrid return gate system comprises a solid state radio frequency switch used to connect and disconnect the return path of a bi-directional communication path in conjunction with a transmission from one of a plurality of remote points. Transmissions from a remote point occur in one of a plurality of dynamically defined contention time slots or reservation time slots. At least one network monitoring time slot can also defined to monitor and/or test the bi-directional cable network. In one embodiment each return gate services a plurality of remote points downstream from the return gate. In a second embodiment each remote point has a dedicated return gate. In either embodiment, the switch in a return gate will connect the return path at the occurrence of a contention time slot accompanied by a return gate enabling prybar signal from a transmitting remote point. A return gate will also connect the return path at the occurrence of a reservation time slot assigned by the headend or due to any other command from the headend.

21 Claims, 7 Drawing Sheets

HYBRID RETURN GATE SYSTEM IN A BIDIRECTIONAL CABLE NETWORK

CROSS REFERENCE TO RELATED APPLICATION

This application is a Continuation-In-Part of United States patent application Ser. No. 08/598,333, filed Feb. 8, 1996, titled "Undesirable Energy Suppression System in a Contention Based Communication Network," which is a Continuation-In-Part United States patent application Ser. No. 08/522,630, filed Sep. 1, 1995, titled "Bi-directional Cable Network Signal Distribution System," and the aforementioned disclosures are hereby incorporated by reference to the same extent as if fully set forth herein.

FIELD OF THE INVENTION

This invention relates to bi-directional cable networks, and more particularly, to a hybrid contention and reservation type return gate system that prevents undesirable energy in the bi-directional cable network's return path from adversely affecting the network.

PROBLEM

Existing cable network plants typically include a bi-directional communication path capability between a network headend and each remote point in the network. A network headend is the collection/origination point for forward path signals into the network and the collection/termination point for return path signals from the network. A collection point and a termination point may not necessarily be the same physical location in the network. A shared wire implementation of a bi-directional communication path is typically a single coaxial cable that simultaneously carries broadband Radio Frequency (RF) signals in two directions on the same cable by dividing the frequency spectrum of the bi-directional communication path. The frequency spectrum is divided into a first frequency range for carrying signals in a first "downstream" or "forward path" direction from a headend signal source to a plurality of remote points, and a second frequency range for carrying signals in a second "upstream" or "return path" direction from each remote point to the headend. For example, a bi-directional communication path might include a first frequency range at or about 54–750 MHz for carrying signals in the forward path direction and a second frequency range at or about 5–40 MHz for carrying signals in the return path direction.

An ideal bi-directional cable network can be defined in terms of several characteristics including, but not limited to, the ability to suppress undesirable energy in the network, the ability to identify undesirable energy sources, the ability to thwart or otherwise reduce the likelihood of pirates or saboteurs in the network, high shared bandwidth efficiency, quality of service reliability, flexible bandwidth allocation, and network sharing. However, no one system prior to the present disclosure satisfies each of the above stated criteria in a bi-directional cable network.

Suppressing undesirable energy in the network is important characteristic when operating a network having a bi-directional communication path on a shared wire between a headend and each of a plurality of remote points. The technical challenge is maintaining adequate network integrity for signals being transmitted simultaneously in the forward path and return path directions so that signals are not contaminated and do not require retransmission. For example, voice transmissions are sensitive to undesirable energy and can not tolerate delays necessary to accommodate retransmissions. Alternatively, non-real time computer data transmissions such as file transfers can tolerate retransmissions but the additional bandwidth resources consumed by retransmissions can significantly limit the overall capacity of the network.

Signals transmitted in the forward path direction from the headend to the remote points enjoy good network integrity because the headend delivers a high quality signal from a controlled source environment. The headend's high quality signal is clearly distinguishable from the noise floor and other undesirable energy. However, signals transmitted in the return path direction from any one remote point to the headend are often not of high quality and can be severely impaired because a remote point is typically an uncontrolled noise producing environment such as a private home. In addition, the remote point is often the network point having an unshielded, improperly connected, or inadvertently cut cable. A private home is considered a potential noise producing environment because it contains multiple entry/origination points for undesirable energy on the bi-directional communication path for reasons including, but not limited to, inadequate house coaxial wiring and/or shield integrity, inadequate grounding, inadequately shielded electrical devices, and imprecise transmission equipment. Noise and other undesirable energy originating at one remote point or at any point along the return path from that remote point, can impair network communications for all remote points in the network. Similarly, where noise and undesirable energy from one remote point is combined with noise and undesirable energy from other remote points in the network, network communications are impaired.

Some existing bi-directional cable network systems unrealistically rely on equipment in remote points being properly shielded and in good repair. Other bi-directional cable network systems, such as the related patent applications cited above, suppress undesirable energy with return gate devices in either contention based network implementations or assigned time slot based network implementation. One example of a contention based network implementation is the Code Division Multiple Access with Collision Detection (CSMA/CD) protocol. Operationally, remote points in a contention based system gain access to the network's return path by simply attempting to transmit data accompanied by a return gate enabling signal until the transmission is successful. If a remote point's transmission attempt fails due to a collision with another contention access user, the unsuccessful remote point merely pauses a random time period prior to attempting a retransmission. Although the network access response time for contention systems is relatively instantaneous by design, the response time is less than optimal during high network loads due to frequent collisions that result between transmitting remote points.

One example of an assignment time slot based network implementation which features a polled reservation system is the Time Division Multiple Access (TDMA) protocol. Operationally, a bi-directional cable network typically continuously broadcasts a timing reference on the forward path of the bi-directional communication path for use by other network components. A return gate uses the timing reference to know when to connect and disconnect the return path. A remote point uses the timing reference to know when to transmit on the return path time slot assigned by the headend. When a polling frame occurs, the headend polls the remote points in the network individually or in groups to determine which remote point wants to transmit. A remote point that has a need to transmit is assigned a time slot in at least one data frame. The time slot assignment is broadcast over the forward path so that the appropriate return gate 5022/014 and remote point receive the assignment information. When the assigned time slot occurs in the series of cyclically reoccurring time slots, the appropriate remote point transmits a signal concurrently with the appropriate return gate connecting the return path so the transmission can proceed through to the headend. The return gate will disconnect the return path at the completion of the assigned time slot. Disconnecting the return path preserves network integrity in the event the transmitting remote point is also producing undesirable energy.

Although a system assigning time slots satisfies many of the ideal bi-directional network characteristics previously mentioned, an assignment time slot based return gate system falls short in many respects including, but not limited to, the quality of service and flexibility characteristics. For example, access to a polling time slot is slow because a remote point wishing to transmit now must wait until it is polled prior to even indicating any desire to transmit. This problem can be remedied by opening all return gates at once on the occurrence of a polling time slot, however, this increases the networks vulnerability to undesirable energy. The problem may also be remedied by more frequent polling of remote points that have active transmissions in progress and less frequent polling of remote points that are not active. Nevertheless, the types of real time transmissions that assignment time slot based systems can realistically accommodate are limited.

Although both above mentioned systems individually suppress undesirable energy on the return path when implemented with the appropriate type of return gate device, users of the respective network implementations are limited to participation in either a contention based network or an assigned time slot based network, sometimes referred to as a reservation type system. Prior to the present invention, the combination of both a contention and reservation type return gate network implementation was not an option because the implementations have opposing network requirements and capabilities. Generally speaking for example, a contention only network lends itself to quick network access although it exhibits low efficiency in moderate to heavy use. Alternatively, a reservation or assignment time slot network provides slow network access yet overall performs with high efficiency even in heavy use.

For background purposes, undesirable energy, often loosely referred to generically as "noise," occurs in many forms including, but not limited to, Gaussian noise, ingress energy, and common path distortion to name a few major types.

Gaussian noise, also called white noise, is the random noise that forms the relatively constant noise floor that crosses all frequencies in the frequency spectrum of a communication path. Gaussian or random noise components include naturally occurring thermal noise that is related to temperature and is well understood in the art. This Gaussian noise forms a noise floor power level which at any given time defines the noise level that a desired RF carrier must exceed to achieve a clearly recognizable signal in a given frequency band.

Ingress is unwanted energy that enters a communication path from a source external to the communication path. Ingress presents one of the greatest problems in a network because the unwanted signal is often an impulse noise that enters the network at a weak point in the network. Weak points in the network are all too often at or near a remote point where there is a shield discontinuity, a poor shield, or a faulty connector. Radio frequency carriers from shortwave radio, citizen's band radio, or other broadcast sources may also enter the network at these weak points and cause interference peaks at specific carrier frequencies in the communication path. Another ingress source is impulse noise consisting of high power short duration energy pulses. The high power energy pulse results in a significant rise in the noise floor while the short duration results in an elusive disruption whose source or entry point into the network is difficult to pinpoint.

Common path distortion is the result of nonlinearities in a network due to physical connector corrosion creating point contact diodes. The effect of these diodes in the return path are triple power peaks at regular 6 MHz intervals in the frequency spectrum.

Regardless of the undesirable energy source, the combination or summation of undesirable energy throughout a network is called "funneling" and results in a "funneling effect". The funneling effect is particularly disruptive because the net noise floor power level is compounded as undesirable energy from multiple sources are combined at directional couplers along the return path of a bi-directional communications path.

The ability to identify undesirable energy sources or saboteurs who are intentionally disrupting the network with undesirable energy in a bi-directional cable network, is important because the undesirable energy sources can not be eliminated in a timely manner if the source is not promptly identified. Existing bi-directional cable network systems can easily identify the presence of undesirable energy by monitoring the noise level in the network. However, locating the precise source of the undesirable energy is difficult and may be accomplished by isolating branches of the network to narrow down the number of possible sources. Unfortunately, isolating branches of the network can be disruptive to subscriber service.

High bandwidth efficiency is important because overall bandwidth is limited and the return path of a bi-directional cable network must be shared among multiple users. Therefore, contention only return gate type network implementations are undesirable because although the network access is fast, the frequent network access collisions in heavier traffic reduce throughout to well below 100% efficiency. Alternatively, although the existing assignment type return gate network implementations are highly efficient in heavy traffic, they offer slow network access.

Differing levels of service is important because certain network users require guaranteed bandwidth, for example, while other network users are satisfied with network access when the bandwidth is available.

Network flexibility and resource sharing is important because different network users require different network resources at different predictable or random intervals. The bandwidth demand, for example, may change based on the time of day or merely due to network growth or adding new resources or services. Types of bi-directional applications that can be added to an existing network that will tax existing network resources include, but are not limited to, support for computer data, public telephone, Internet telephone, video conferencing, interactive games, remote utility meter reading, and home office support.

Due to the above stated limitations in existing bi-directional cable networks, including but not limited to contention only and reservation only type systems, there is a need for a bi-directional cable network implementation that can minimize undesirable energy in the return path of a bi-directional network thereby preventing such energy from disrupting overall bi-directional network integrity, while also efficiently and cost-effectively accommodating the remaining criteria discussed above. A solution to this problem has heretofore not been realized prior to the solution disclosed in detail and claimed below.

SOLUTION

The above described problems are solved and a technical advance achieved in the field by the hybrid return gate system of the present invention. The hybrid return gate system of the present invention suppresses undesirable energy by operating at least one return gate in the return path of a bi-directional communication path to isolate one or more remote points from the rest of the network, or to control return path access for return path transmissions from one or more remote points in the distribution branches controlled by the respective return gates regardless of the choice of transmission protocol. Thus, the hybrid return gate system can provide quick network access concurrently with high network efficiency in any type of network traffic regardless if the underlying network transmission protocol is contention based, reservation/assignment based, or any combination of contention and reservation/assignment based.

The hybrid return gate system can isolate one or more remote points in the distribution branch controlled by a given return gate by a headend command instructing a return gate device containing the return gate to disconnect the return path and to leave the return path disconnected until further instructions are received from the headend.

The hybrid return gate system can control return path access for return path transmissions from one or more remote points in the distribution branch controlled by a given return gate by connecting and disconnecting the return path at predetermined times in concert with an identifiable one of a plurality of cyclically reoccurring time slots. The plurality of cyclically reoccurring time slots are subdivided into frames and the time slot types can include, but are not limited to, contention time slots, reservation time slots, and network test time slots. Contention time slots can be further categorized as short contention time slots and long contention time slots. Thus, given the type of time slot that is present at any given time in the cycle of time slots, the return gate system is a hybrid system because a return gate can function as either a headend enabled return gate in a reservation time slot mode or in a remote point enabled return gate in a contention time slot mode.

The headend of the hybrid return gate system dynamically defines the series of cyclically reoccurring time slots in view of real time network demand and/or predetermined time slot configurations. For example, depending on the demand for contention or reservation time slots, the number of contention or reservation time slots can be dynamically reconfigured to include more or fewer of either type of time slot in addition to increasing or decreasing the existing time slots as necessary to accommodate the network demands. Further, the hybrid return gate system can be redefined to operate as a contention only system or reservation only system by reconfiguring the time slot cycle as being only contention time slots or reservation time slots respectively. The time slot configuration and a timing reference signal are broadcast across the network by the headend on the forward path of the bi-directional communication path.

A remote point can transmit data in a contention time slot at will by generating a return gate enabling prybar signal and transmitting the desired data packet at the next occurrence of a contention time slot along with the gate enabling prybar signal. If the contention transmission is not successful, the transmission can be retried after a random time interval. All return gate devices in the network continuously monitor the return path to detect return gate enabling prybar signals accompanying a contention time slot transmission. If a contention time slot transmission originated from a remote point that is in the distribution branch of a given return gate device and the return gate enabling prybar signal accompanying the contention time slot is valid, then the return gate device enables the appropriate return gate to allow the contention time slot transmission to pass on the return path. In the mean time all other return gates in the network maintain the respective return path sections disconnected. A contention time slot transmission for purposes of transmitting a small amount of data on demand will typically use a long contention time slot. Short contention time slots are typically used only for requesting reservation time slot assignments as disclosed below.

A remote point can transmit data in a reservation time slot on command from the headend by first requesting a reservation time slot assignment and then transmitting data in the reservation time slot assigned to the requesting remote point by the headend. A reservation time slot request is made by transmitting the request in a contention time slot in a manner as previously disclosed. Typically a short contention time slot is used to make a reservation time slot request. A reservation time slot request can request a single reservation time slot or multiple reservation time slots at one time. The headend broadcasts reservation time slot assignments on the forward path so that the requesting remote point and the return gate device controlling the distribution branch on which the remote point resides are both aware of the assignment. When the assigned reservation time slot occurs, the requesting remote point transmits in the assigned reservation time slot concurrently with the respective return gate device connecting the return path for the duration of the assigned time slot. At the end of the assigned time slot the return gate device disconnects the return path to prevent other signals from passing through the return gate.

DETAILED DESCRIPTION

Figure 1:
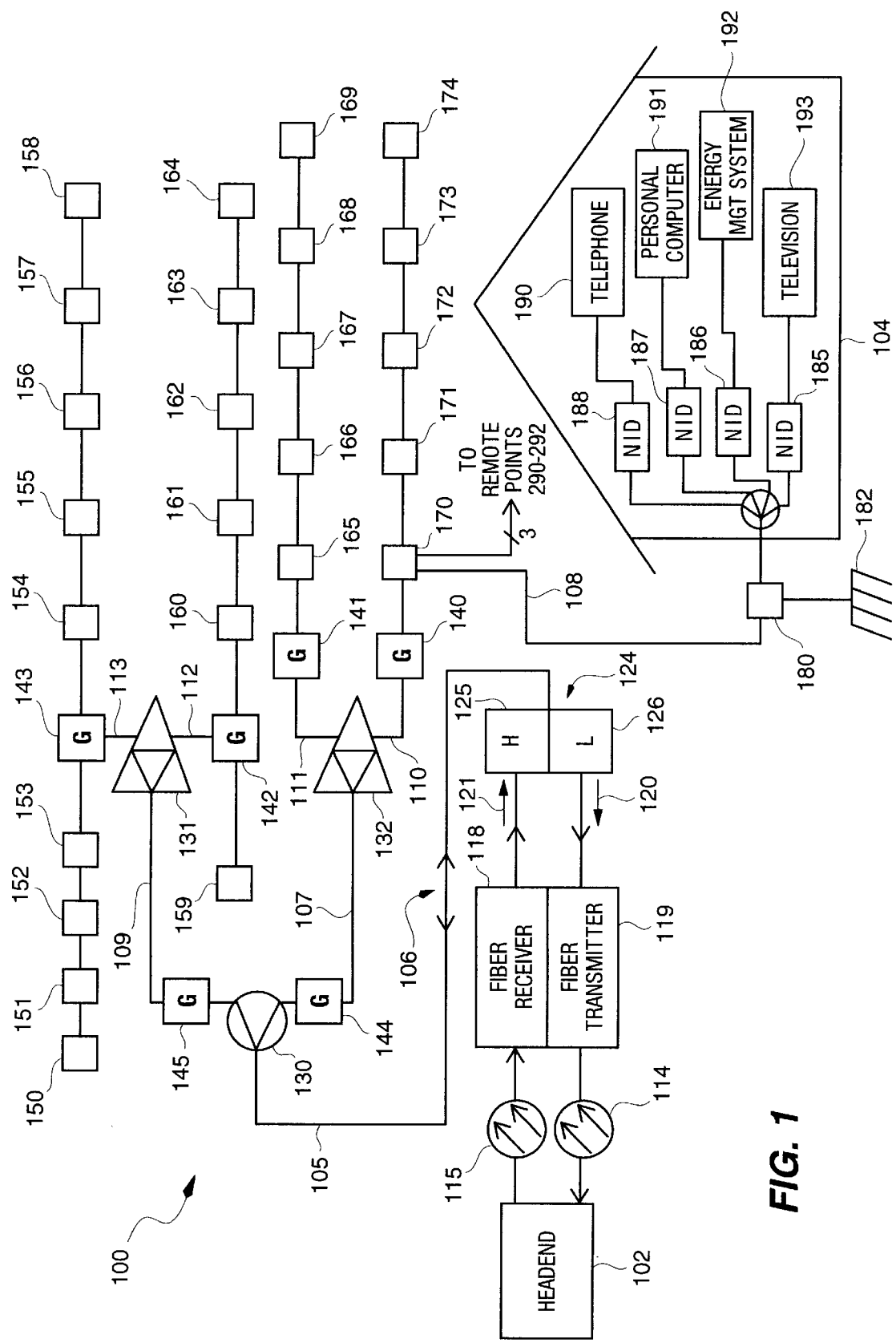
FIG. 1 illustrates a bi-directional cable network in block diagram form.

Bi-directional Cable Network—FIG. 1

FIG. 1 illustrates the primary components of a bi-directional cable network 100 which is a fiber-coax tree-and-branch network topology commonly found in the industry. The bi-directional cable network 100 includes a headend 102 and at least one remote point 104 having a bi-directional communication path 106 therebetween. Headend 102 could also be a distribution hub. In a preferred embodiment, a headend 102 is not only a physical point in a network, it is a collection of functions and capabilities. Among the functions and capabilities considered part of a headend is a system controller having capabilities including, but not limited to, the ability to manage and/or control two-way communication functions including return gate devices and remote point devices, also known as Network Interface Devices (NIDs). A system controller can be physically located anywhere in the network and still be considered part of the "headend." The tree-and-branch network topology is illustrated in FIG. 1 by a primary trunk 105 that branches into secondary trunks 107 and 109 which branch into distribution branches 110–113 and finally individual drop lines such as drop line 108.

Each distribution branch 110-113 contains a plurality of network taps 150–174 that each provide a plurality of drop line cables such as drop line 108 that connects remote point 104 to distribution branch 110 at network tap 170. A single network tap such as network tap 170 for example, typically supports 2, 4 or 8 drop lines to a similar number of remote points. A network tap is well known and available in the cable industry, and typically includes a first directional coupler to tap the distribution branch cable, a second directional coupler to produce the desired number of drop lines exiting the network tap, and an optional power passing circuit to jump the first directional coupler so that power can be delivered to other active devices. Although network tap 170 can support multiple drop lines, only one drop line 108 is illustrated to connect remote point 104 to distribution branch 110 to simplify FIG. 1 and the accompanying text.

The bi-directional communication path 106 is a single physical cable that simultaneously carries broadband radio frequency (RF) signals in both directions between the headend 102 and a plurality of remote points including, for example, remote point 104. Simultaneous bi-directional communication on a single physical wire is accomplished by dividing the RF spectrum into a first frequency range and a second frequency range. The first frequency range carries signals in a first "downstream" or "forward path" direction 121 from the headend 102 to each of a plurality of remote points such as remote point 104. The second frequency range carries signals in a second "upstream" or "return path" direction 120 from each remote point, such as remote point 104, back to headend 102. For example, a typical bi-directional communication path 106 might include a first frequency range at or about 54–750 MHz for carrying signals in the forward path direction 121 and a second frequency range at or about 5–40 MHz for carrying signals in the return path direction 120.

Bi-directional communication path 106 can include, but is not limited to, a coaxial cable, fiber optic cable, or a mixed system of fiber optic and coaxial cable, all which are commonly used and available in the industry. FIG. 1 illustrates a hybrid fiber-coax network where a fiber optic cable extends from headend 102 through fiber optic forward fiber 115 and fiber optic return fiber 114, and fiber receiver and transmitter 118 and 119 using apparatus commonly known and available in the communications industry. Coaxial cable is regularly used in portions of the network nearer the distribution branches 110–113 toward the remote ends. Diplex filter 124 filters and joins the first and second frequency ranges in bi-directional communication path 106 onto a single physical cable. The filtering is accomplished with high-pass filter 125 for the first high frequency range, and low-pass filter 126 for the second low frequency range. Diplex filters are well known and available in the cable industry.

Remote point 104 is connected to distribution branch 110 at network tap 170 by way of drop line 108. Drop line 108 is grounded at ground block 180 by an earth ground 182 to protect the network 100 and remote point 104 from lightning strikes. Drop line 108 terminates at Network Interface Devices (NID) 185–188. Each NID 185–188 is the network interface for a piece of terminal equipment 190–193 located in remote point 104. NID 185–188 details are discussed in further detail in the text accompanying FIG. 3. Types of terminal equipment 190–193 can include, but are not limited to, voice, data, and/or video telephone equipment 190, personal computing equipment 191, energy management equipment 192 for heating/cooling systems and/or utility service meters, and television equipment 193. User/subscriber's that do not wish to replace their traditional Set Top Box (STB) with NID 185 are full supported by the signal distribution system of the present invention as discussed in the text accompanying FIG. 5–7.

Directional coupler 130 is a commonly used device that splits and joins branches in the bi-directional cable network 100. For example, directional coupler 130 splits primary trunk 105 into secondary trunks 107 and 109 so that both secondary trunks 107 and 109 contain all forward information. Similarly, directional coupler 130 joins secondary trunks 107 and 109 into primary trunk 105. Amplifiers that also contain directional couplers are illustrated by directional coupler/amplifiers 131–132.

Each return gate device 140–145 contains return gate control circuitry including a return gate switch that is necessary to facilitate unrestricted signal flow in the forward path direction 121 and controlled signal flow in the return path direction 120. In the present hybrid return gate device embodiment, the return gate switch controls signal flow in the return path direction 120 in a time division multiplexed manner for streams of data such as voice transmissions and in a contention manner for bursty data such as some computer data. Return gate devices are ideally located in either primary or primary and secondary positions within bi-directional cable network 100. Primary return gate device positions within bi-directional cable network 100 are positions nearest the remote points including, for example, return gate devices 140–143. Secondary return gate device positions within bi-directional cable network 100 are positions nearer to the headend 102 that are upstream from at least one primary return gate device position. Secondary return gate device positions include including, for example, return gate devices 144–145.

Because a single return gate device 140, for example, can only suppress unwanted energy that enters the return path in the remote point side of the return path, a secondary return gate device 144 provides an additional suppression point further toward the headend from primary return gate device 140. Therefore, not only do return gate devices 140–145 provide the return gate apparatus for intermittently isolating the respective distribution branches except to allow return path signals to pass, any return gate device 140–145 can be used to continuously isolate its respective distribution branch if unwanted energy originating from a remote point on the branch is so severe so as to threaten network integrity throughout bi-directional cable network 100.

Figure 2:
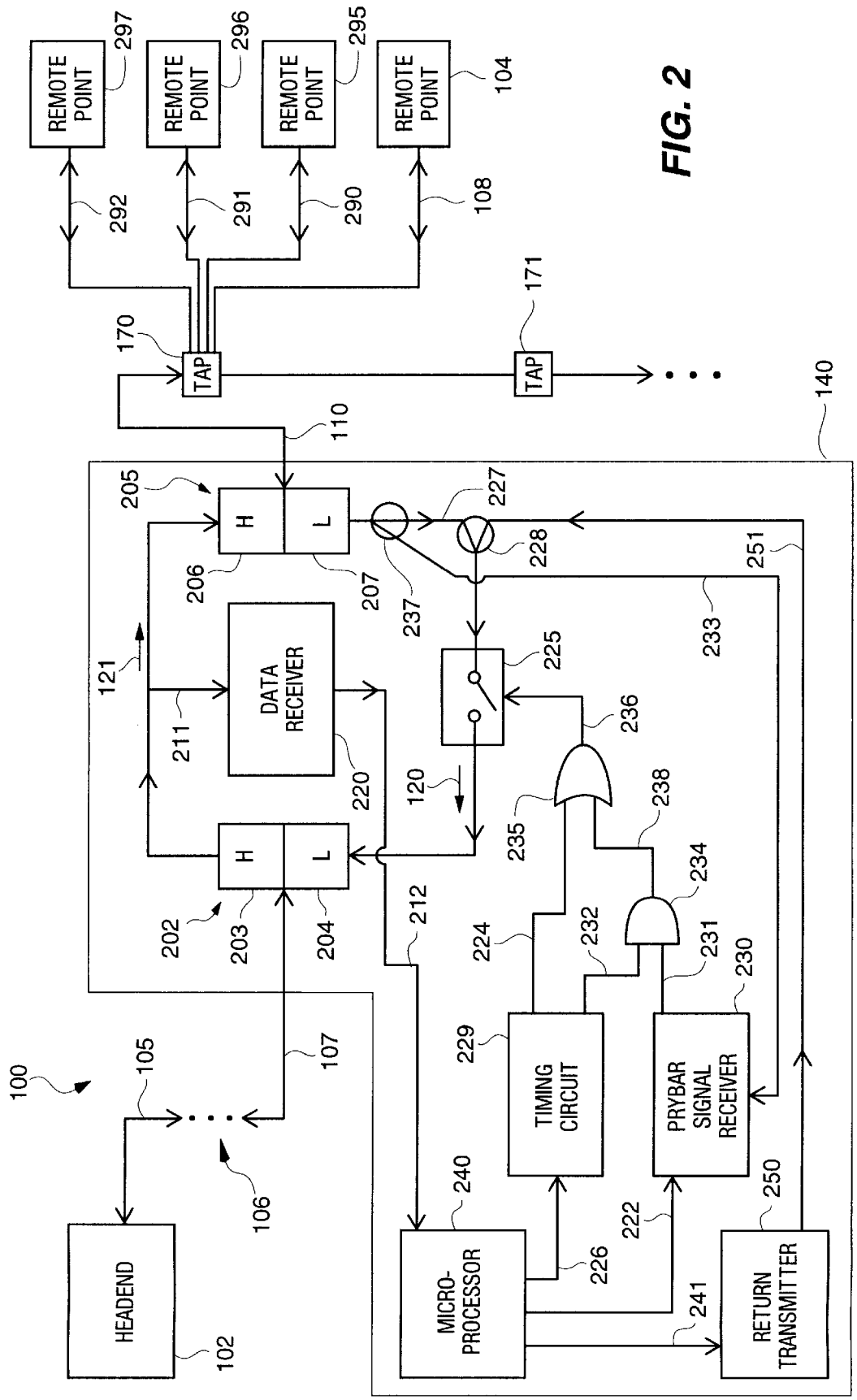
FIG. 2 illustrates a hybrid return gate device in block diagram form.

Hybrid Return Gate Device—FIG. 2

FIG. 2 illustrates the details of a hybrid return gate device 140 as it would be implemented in any of the return gate devices 140–145. Components within return gate device 140 are individually well known and understood in the electronics industry and are widely available from multiple commercial sources in the cable industry. Further, there is no operational difference between a primary hybrid return gate device 144 or 145 or any other secondary return gate device 140–143 in bi-directional cable network 100. Note also that the hybrid return gate device of FIG. 2 can alternatively be implemented in a manner that includes a dedicated return gate for each remote point in the network. A further alternative includes a mixture of shared return gate devices and dedicated remote point return gates.

Return gate device 140 is connected to headend 102 by way of primary trunk 105 and secondary trunk 107 portions of bi-directional communication path 106. Return gate device 140 is connected to network taps 170–171 by way of distribution branch 110. Network tap 170 illustrates the drop line connectivity to a plurality of individual remote points 104 and 295–297 by way of drop lines 108 and 290–292. Return gate device 140 contains individual components that are well known and available in the electronics industry. Power for return gate 140 is typically 60 or 90 volt 60 cycle power that can be taken from the lowest frequency bands of a coaxial cable based bi-directional communication path 106. The return gate device 140 is also designed to withstand hostile outdoor environmental factors including, but not limited to, temperature, humidity, and lightning strikes, in any manner well known and practiced in the cable industry.

The headend 102 side of bi-directional communication path 106 enters return gate device 140 at diplex filter 202. Forward path 121 is separated from bi-directional communication path 106 by high-pass filter 203. Data receiver input line 211 taps the forward path 121 for data receiver 220 so that status monitoring, switch testing, switch use, timing, and other administrative information and commands can be extracted from the forward path for use by microprocessor 240. Data on input path 211 can be Frequency-Shift Keyed (FSK), Quadrature Amplitude Modulated (QAM), or Vestigial Sideband (VSB) modulated for data receiver 220. The forward path 121 rejoins distribution branch 110 by way of high-pass filter 206 of the diplex filter 205. The bi-directional output of diplex filter 205 is the distribution branch 110 which delivers the forward path part of bi-directional communication path 106 to the network taps 170–171. Network tap 170 provides bi-directional drop line 108 and 290–292 connections to remote points 104 and 295–297.

The return path 120 portion of distribution branch 110 is separated by low-pass filter 207 of diplex filter 205 and the output of low-pass filter 207 is split into leads 233 and 227 by directional coupler 237. Lead 227 is the first of two inputs to directional coupler 228. The second input to directional coupler 228 is the return transmitter output lead 251 from return transmitter 250. The return path 120 output from directional coupler 228 passes through the return gate 225 and rejoins bi-directional communication path 106 by way of low-pass filter 204 of the diplex filter 202.

Return gate 225 opens and closes to disconnect and connect the return path 120 substantially concurrently with a transmission by a transmitting one of the remote points 104, 295–297. The return gate 225 connects and disconnects the return path in response to the presence or absence of a gate enabling signal on lead 236. In one preferred embodiment the return gate 225 is terminated at 75 ohms when the return path is disconnected.

A gate enabling signal on lead 236 is generated from OR-gate 235 only if one or the other inputs on leads 224 and 238 are enabled. Leads 224 and 238 will never be enabled at the same time in the preferred embodiment. Lead 224 carries an enabling signal from timing circuit 229 to OR-gate 235 concurrently with a reserved time slot that is assigned to a remote point within the distribution branch of remote point device 140. Lead 238 carries an enabling signal from AND-gate 234 to OR-gate 236 only if lead 232 is enabled by timing circuit 229 at the occurrence of a contention time slot, simultaneously with lead 331 enabled by prybar signal receiver 230 in response to a valid prybar signal from a remote point in the distribution branch of remote point 140.

Prybar receiver enabling lead 222 from microprocessor 240 can also be used to disable or otherwise control or communicate with prybar receiver 230. The prybar signal receiver 230 would be disabled for reasons that might include, but are not limited to, thwarting pirate or saboteur attempts to use or disrupt the network, or to isolate a distribution branch containing a noisy remote point or if no remote point services are deployed downstream from return gate device 140. Timing circuit enabling lead 226 from microprocessor 240 can be used to disable or otherwise control or communicate with timing circuit 229. The timing circuit 229 can be disabled for reasons similar to those for the prybar signal receiver 230.

Operationally, when the prybar receiver 230 is enabled by a signal on the prybar receiver enabling lead 222, the prybar receiver 230 outputs a signal on lead 231 if a legitimate prybar RF signal is received on lead 233. In one preferred embodiment the prybar receiver output signal occurs in a time slot following when the enabling signal is received. If a transmission on a contention time slot is occurring and is accompanied by a valid return gate enabling prybar signal on lead 233, then leads 231 and 232 are enabled which enables AND-gate 234, thus enabling lead 238 and OR-gate 235 to finally enable lead 236 and return gate 225. Enabling return gate 225 connects the return path 120 for the immediate transmission. Alternatively, if a reservation time slot transmission is occurring on a reservation time slot assigned by the headend 102 for a remote point on the distribution branch serviced by a given remote point device, then lead 238 is low and return gate 225 is enabled for the duration of the reservation time slot by way of an enabling signal on lead 236 via lead 224. In other words, if the return gate 225 is being enabled by a remote point generated prybar signal only, then lead 224 will never be enabled. If the return gate 225 is being enabled by the headend or due to the presence of an assigned reservation time slot, then lead 232 will not go high.

Lead 241 carries return path control data and timing signals from microprocessor to return transmitter 250. Return transmitter 250 is used to prepare and transmit diagnostic signals and/or administrative messages to the headend 102 by way of return transmitter lead 251, return gate 225, and return path 120. Return transmitter 250 is also used as needed for return gate device 140 administrative communication purposes or for return gate isolation or testing as disclosed herein.

The present embodiment of return gate device 140 can also be used to detect attempts by pirates or saboteurs to gain access to the network 100 or to remotely detect defective NID devices in remote points. Such detection can be accomplished by having the return gate device 140 monitor the activity of prybar receiver 230. Any attempt to enable the return gate 225 while the return path 120 is unavailable will be detected by the return gate device 140. An alarm can be triggered and/or a report transmitted to the headend 102 over a status monitoring channel on return path 120.

A prybar signal, otherwise known as a gate enabling signal, can be an in-band signal or an out-of-band signal relative to the data transmission from the remote point. The prybar signal can be an access code that is transmitted on the forward path from the headend to a NID at each remote point as a public or secret code. A secret code may also be an encrypted code. The prybar signal may be one or more tones or frequencies used to enable a return gate, or the prybar signal may be a digital code similar to the programmable digital codes on a digital garage door opener. Alternatively, a prybar signal can be a preamble or a header on a transmitted data packet. Each return gate device in the bi-directional communication path of a remote point may also receive a prybar signal access code so that the signal access code for a single remote point or all of a plurality of remote points that have unique codes or share a common code, can be updated or otherwise changed so that the return gate will only respond to a new updated or otherwise changed code rather than an old code, thus further frustrating would-be pirates.

If primary and secondary return gates are used in the network with gate enabling prybar signals, it should be recognized that depending on the implementation, both return gates may not detect the prybar signal at the same time. There are a number of solutions available to address this problem, such as using the prybar signal only to enable the primary return gate and using other propagated signals to enable the secondary return gates, or merely allowing time for the multiple gates to sequentially connect the return path as the transmitted signal reaches each return gate.

Microprocessor 240 contains the system intelligence that controls all components and activities of the return gate device 140. Specific microprocessor 240 functions include, but are not limited to, managing remote point address information, prybar codes responding to headend 102 commands, testing return gate 225 isolation capability, testing power levels on the forward and return paths 121 and 120, reporting the prybar of the return gate device 140, and enabling the prybar receiver 230. Testing the isolation of return gate 225 includes holding return gate 225 open while return transmitter 250 transmits a calibrated test signal on return transmitter lead 251. Testing power levels in the system helps identify and locate breaks or bad connections in the network.

The advantage of the return gate device 140 embodiment in FIG. 2 is that a single return gate 225 can provide testing and return gate management service to all remote points within the return gate devices distribution branch. In the present illustration, the distribution branch of return gate 140 includes distribution branch 110 and any network tap and remote point connected thereto. The disadvantage, however, is that if one remote point in distribution branch 110 begins uncontrolled transmitting or otherwise is the source of undesirable energy on return path 120, all remote points on the distribution branch can be adversely affected. Thus, the headend 102 can identify the source of the undesirable energy down to the distribution branch level and permanently force return gate 225 open to protect the rest of the network until the actual undesirable energy source is eliminated.

In an alternative embodiment, the hybrid return gate can be further modified to include a dedicated return gate located in or at the network tap for each remote point. A dedicated return gate for each remote point functions in the same manner as disclosed above and facilitates isolating individual remote points who are undesirable energy sources or who simply are no longer network subscribers. In addition, locating the return gate in the network tap presents an opportunity to include a forward gate for each remote point so that non-subscribers can be easily disconnected or reconnected to the network. Additional advantages to locating forward gate and return gate equipment in a network tap include, but are not limited to, shared power supply for multiple forward gates and return gates, a shared housing, and shared gate control components 220, 230, 240, and 250. An example of another circuit function that can be included in a shared network tap housing is an interdiction device that can be used to deny service on forward path carriers by jamming the carriers with RF energy.

Figure 3:
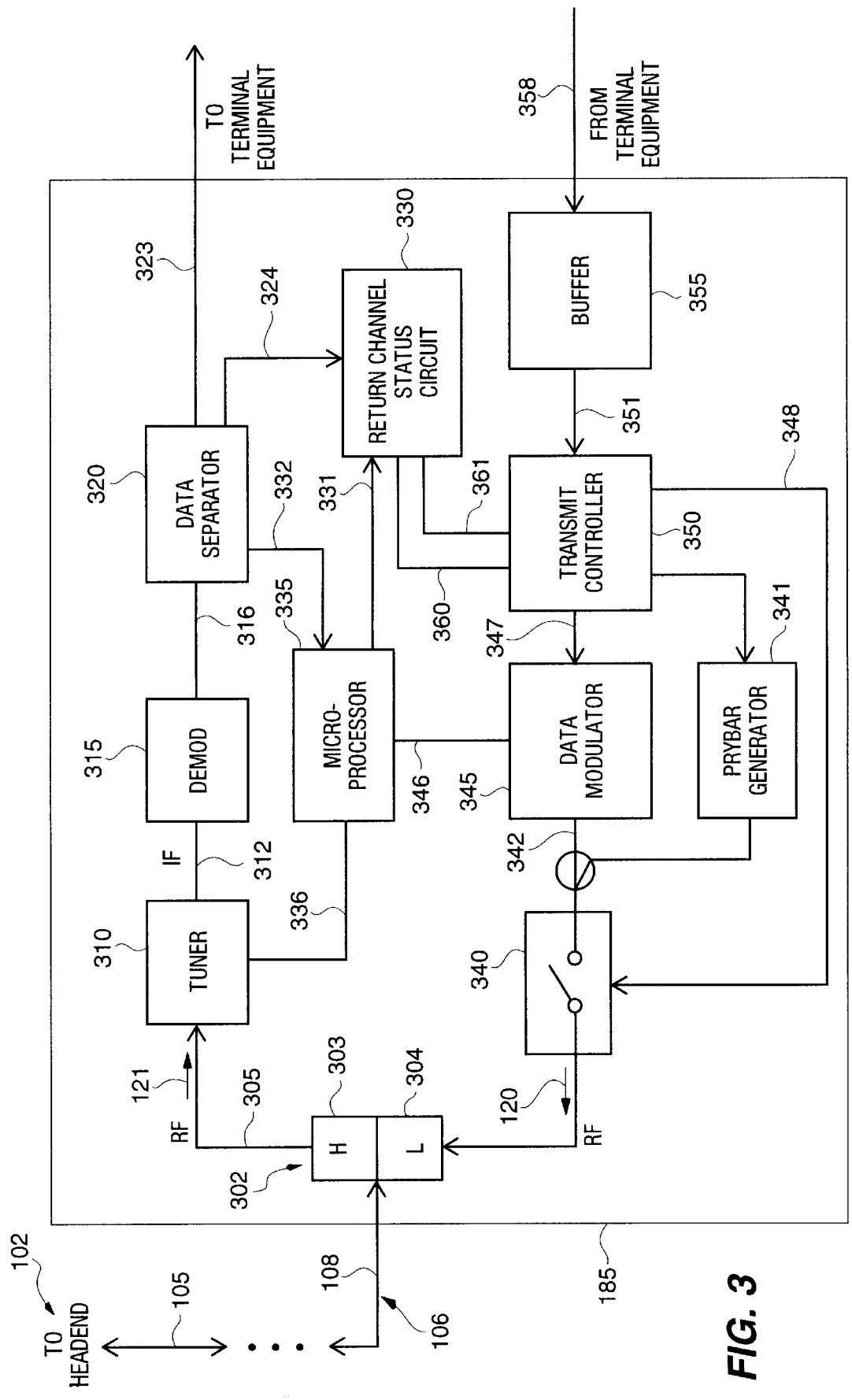
FIG. 3 illustrates a hybrid Network Interface Device (NID) in block diagram form.

Hybrid Network Interface Device—FIG. 3

FIG. 3 illustrates a Network Interface Device (NID) for a hybrid return gate system. Drop line 108 connects NID 185 for example, to headend 102 by way of the bi-directional communication path 106. NID 185 is also connected to the user/subscriber's terminal equipment by way of forward path 323 and return path 358.

The forward path 121 portion of drop line 108 is separated from drop line 108 by high-pass filter 303 of the diplex filter 302. The RF signal on forward path 121 from high-pass filter 303 is the input to tuner 310. Tuner 310 locks onto the predetermined RF frequency band intended for use by the particular type of terminal equipment attached to NID 185, and converts the RF signal to an Intermediate Frequency (IF) output 312 under the control of microprocessor 335. Microprocessor 335 is connected to tuner 310 by way of microprocessor control lead 336. Additional tuner 310 functions besides frequency conversion include, but are not limited to, filtering the digital data carrier of forward path 121, and providing automatic gain control of the IF output 312.

IF output 312 is demodulated by demodulator 315 to extract data from the IF carrier frequency. Baseband data on lead 316 from demodulator 315 is separated into return channel status and forward path data components by data separator 320. The forward path data output from data separator 320 is delivered to the attached terminal equipment by way of forward path data lead 323. Data separator 320 may also provide decryption of the forward data if it has been encrypted for security reasons. The user/subscriber's terminal equipment may also receive a clock reference from data separator 320 if desired. Other forward path data separated by data separator 320, including but not limited to, a timing reference and reservation time slot assignment information, is delivered respectively to the timing circuit 330 by way of lead 324 and microprocessor 335 by way of lead 332.

Return path data from a user/subscriber's terminal equipment in a remote point is delivered to NID 185 by way of return path data lead 358. The return path data is buffered in data buffer 355 until a data block or frame is available for transmission by transmit controller 350. Buffer output on lead 351 is input to transmit controller 350. The transmit controller 350 can also be used to randomize the data as baseband burst data, or to provide interleaving or Forward Error Correction (FEC), or to provide header or address information. Encoded output on lead 347 is a baseband signal that is modulated onto the appropriate carrier frequency by data modulator 345 under the direction of microprocessor 335 over lead 346. Data modulator 345 may use any type of modulation that is suitable for transmitting in a frame or block including, but not limited to, Orthogonal Frequency Division Multiplexing (OFDM), QAM, VSB, or CDMA modulation. Data modulator 345 may also regulate the return path transmission power levels under command of the headend 102. RF output on lead 342 from data modulator 345 can be optionally regulated by anti-babble controller 340 subject to timing control from transmit controller 350 over timing control lead 348. Anti-babble controller 340 is optionally used so that the return path 120 is not jammed in the event data modulator 345 fails to control return path transmissions from the remote point. Return path output direction 120 from anti-babble controller 340 is reunited with the forward path direction 121 of the bi-directional communication path 106 by way of low-pass filter 304 of the diplex filter 302. Prybar generator 341 generates and transmits the prybar signal to enable the return gate 225 in FIG. 2, in conjunction with a transmission from data modulator 345. The prybar signal may be an out-of-band analog or digital transmission.

Return path status data from data separator 320 is delivered to return channel status circuit 330 by way of status input lead 324. Return channel status circuit 330 receives authorization and general return path control information from microprocessor 335 by way of microprocessor control lead 331. Return channel status circuit 330 generates control signals to the transmit controller 350 indicating that a time slot on the return channel 120 is either available for contention or reserved for NID 185 by way of contention lead 360, or reservation lead 361, and busy lead 362 respectively. Transmit controller 350 directs and coordinates the data modulation by data modulator 345, anti-babble controller 340, and prybar signal generator 341, in synchronization with either a reservation or contention time slot transmission on return path direction 120.

Figure 4:
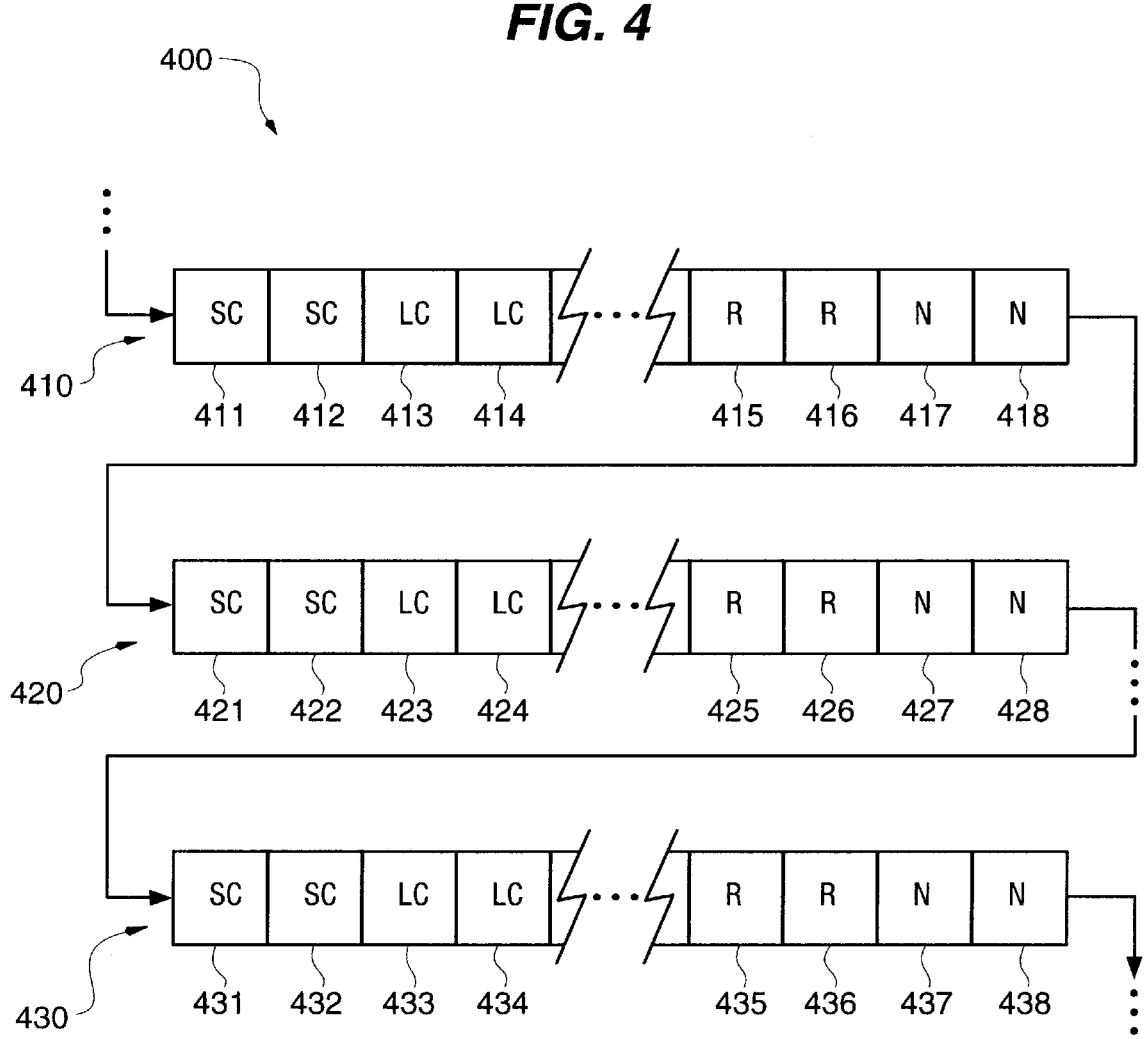
FIG. 4 illustrates a hybrid return gate system time slot definition in block diagram form.

Hybrid Time Slot Definition—FIG. 4

FIG. 4 illustrates an example of a hybrid time slot definition format 400 for use in return path transmissions from a remote point to the headend 102. The hybrid implementation operates in a manner that provides an apparent point-to-point connection on a shared basis between each remote point and the headend 102. One important point about the hybrid time slot definition is that the definition is dynamic as determined by the headend 102 in real time and the definition is flexible so that multiple protocols can be accommodated from network access by contention through network access by pure TDMA and any combination therebetween. One example of the system's flexibility is that a pure contention configuration that does not use time slots can be accommodated by defining one large contention time slot spanning all frames.

The hybrid time slots 400 are a series of M cyclically reoccurring time slots within a continual progression of frames 410, 420 and 430. Time slot types can include, but are not limited to, contention time slots 411–414, 421–424, and 431–434, reservation time slots 415–416, 425–426, and 435–436, and network time slots 417–418, 427–428, and 437–438. In a preferred embodiment the contention time slots are further characterized as short duration contention slots 411–412, 421–422, and 431–432, and long duration contention slots 413–414, 423–424, and 433–434. The total number of time slots M among the multiple frames can be varied by the headend 102. The number of time slots can be increased by increasing the length of the frames or by reducing the slot duration so that more time slots can be fit into existing frames. Further, depending on the network demand or other circumstances, the time slots may all be of one type or a majority of one type. If the mix of time slots is dynamically varied, the new time slot definition is broadcast across the network by way of the forward path. Preferably, individual time slots or types of time slots can be dynamically varied by the headend 102 in size and duration depending on the real-time demands of the network users. The number, size, and duration of time slots can vary as determined by the headend 102 depending on various criteria including, but not limited to, types of services being offered, quality of service being offered, and instantaneous demand for services. A typical time slot duration might be about 100 $\mu$s, and a short contention time slot might be a fraction of that time.

Short contention time slots 411–412, 421–422, and 431–432 may be used by remote points to request a bandwidth reservation from the headend controller for a subsequent data transfer, or to send any other service request or response, or merely to send a minimal data content transmission such as a "ping". Long contention time slots 413–414, 423–424, and 433–434 may be used by remote points for larger data transmissions on a contention basis. Reservation time slots 415–416, 425–426, and 435–436 may be used for high volume data transmissions on a permanent assignment basis or on a request and temporary assignment basis. An initial request for a temporary reservation time slot assignment can be made by way of a short contention time slot and an ongoing chain of requests for additional reservation time slots can be part of an existing time slot assignment transmission. Network time slots 417–418, 427–428, and 437–438 are typically used by the headend for a variety of network test and/or verification functions. For example, late at night the mix of time slots can be dynamically changed to include a majority of network time slots and only a few contention and/or reservation time slots. Thus, the network time slots can be used to poll through the network so that the headend 102 can listen for undesirable energy when few remote points are transmitting. Network slots may also be used for status monitoring of network elements including amplifiers, stand-by power supplies, fiber nodes, and return gate devices. Another use of network time slots is to test the bi-directional path between the headend and the remote points in terms of frequency response, group delay, and/or dynamic range testing.

Figure 5:
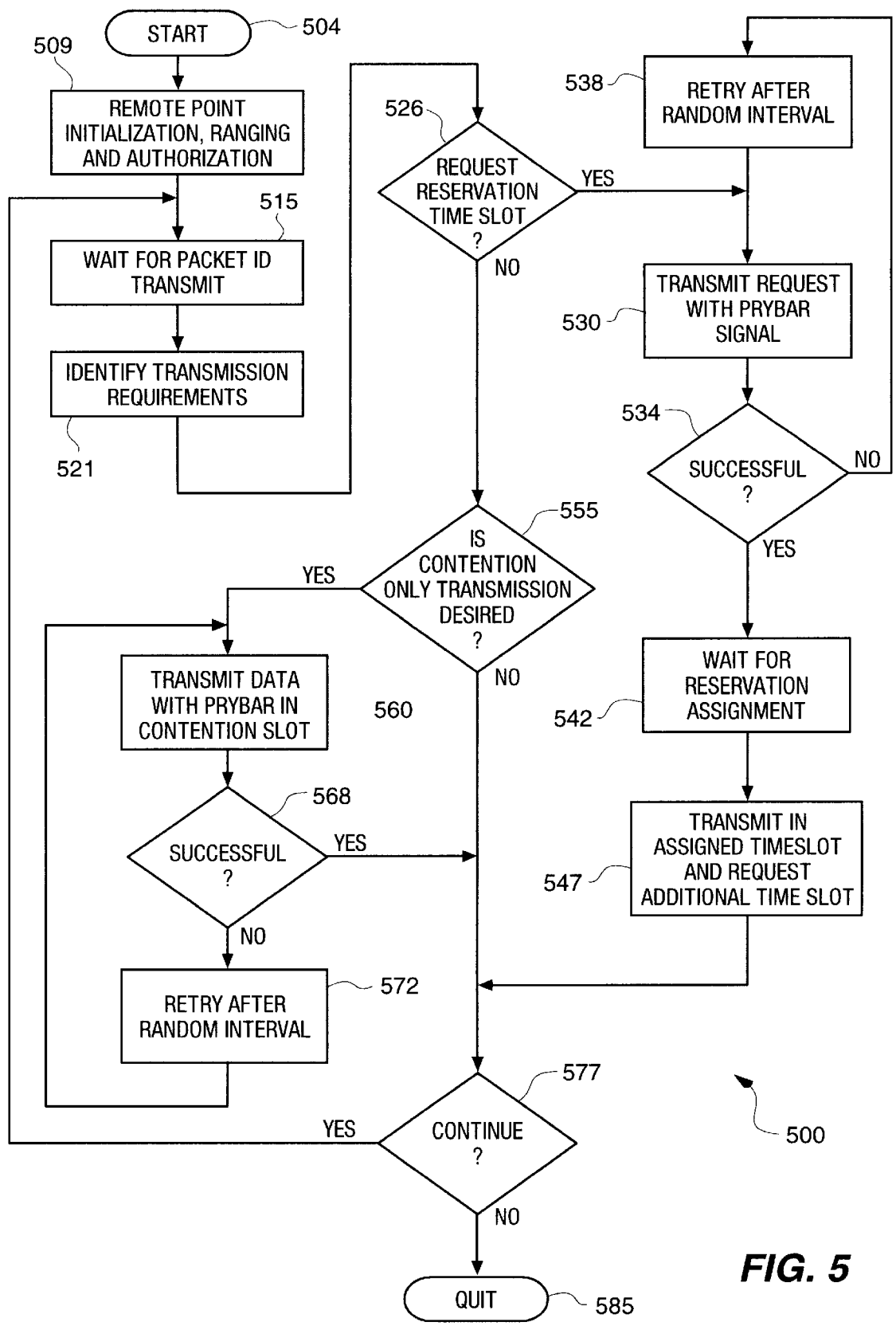
FIG. 5–7 illustrates hybrid return gate system operational steps in flow diagram form.
Figure 6:
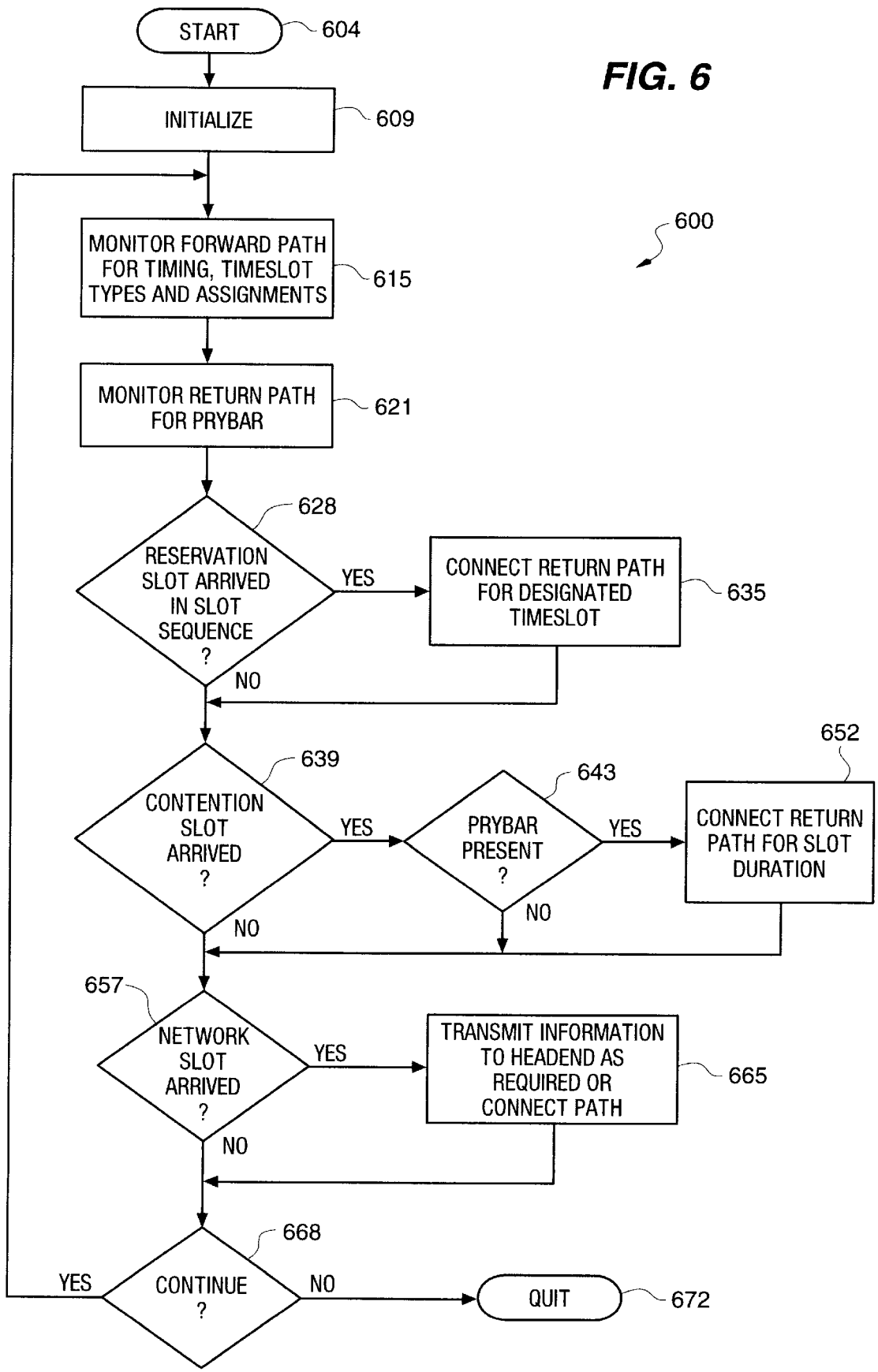
Figure 7:
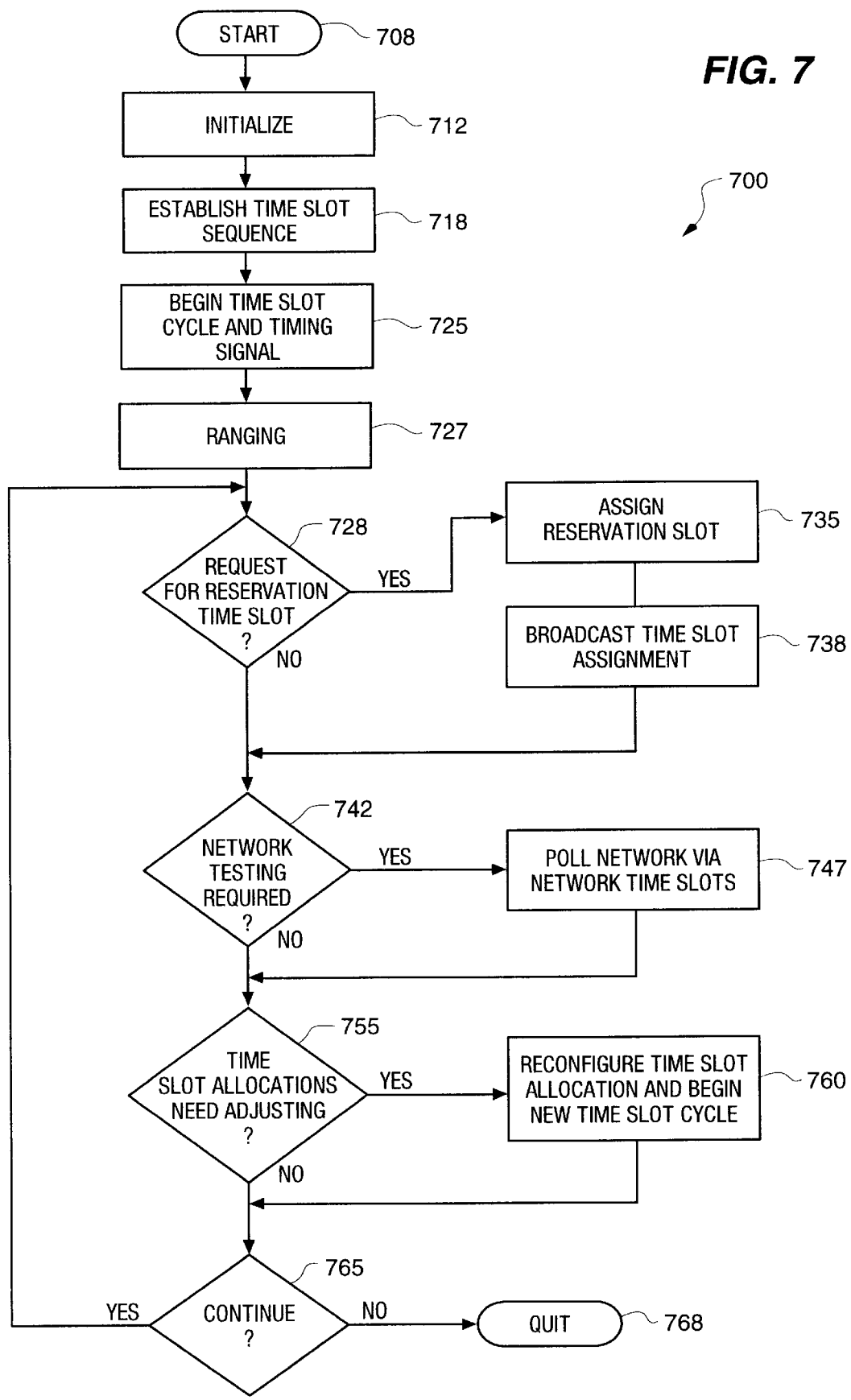

Hybrid System Operational Steps—FIGS. 5–7

FIGS. 5–7 illustrate the operational steps 500, 600, and 700 of a hybrid system in flow diagram form. Specifically, FIG. 5 illustrates operational steps 500 from the perspective of a remote point 104. FIG. 6 illustrates operational steps 600 from the perspective of a return gate device 140. FIG. 7 illustrates operational steps 700 from the perspective of a headend 102.

The operational steps 500 in FIG. 5 begin at step 504 and proceed to remote point initialization and ranging at step 509. Initialization includes, but is not limited to, powering up a NID 185 in the remote point 104 to facilitate transmitting signals on the return path of the bi-directional communication path. Ranging is the process of sending a return addressed test signal through the network to determine the distance between the remote point and the headend. Depending on the distance determined by ranging, the headend may adjust the time that packets are sent from specific remote points so that messages from far away remote points are not received late due to the distance delay factor.

After initialization and ranging, the remote point will wait for a packet to transmit on the return path. When a packet is available to send, the remote point identifies the transmission requirements at step 521 to determine if a short contention time slot, long contention time slot, or reservation time slot is needed to satisfy the transmission need. If it is determined that a reservation time slot or slots are needed, then at decision step 526 processing continues at step 530 by attempting to transmit a reservation time slot request on the next available contention time slot. In one preferred embodiment, a short contention time slot is used to transmit reservation time slot requests. The contention time slot is accompanied by a return gate enabling prybar signal to instruct the return gate device to connect the return path so that the present transmission can pass through. If at decision step 534, the reservation time slot request on the next available contention time slot is not successful, then processing continues at step 538 where processing pauses for a random interval prior to retrying the reservation time slot request again at step 530.

If at decision step 534 the reservation time slot request is successful, then processing continues at step 542 where the remote point waits for a reservation time slot assignment to arrive from the headend via the forward path. When the reservation time slot assignment is received from the headend, the requesting remote point transmits the desired data in the assigned reservation time slot in addition to piggybacking a request for at least one additional reservation time slot if additional reservation time slots are needed. Additional reservation time slots are requested by piggyback on presently assigned reservation time slots until no additional reservation time slots are required. Alternatively, the total number of reservation time slots could be calculated at step 521 and a total number of reservation time slots or some multiple number of reservation time slots could be requested and assigned at one time. Further, the reservation time slot assignment can be on random time slots, multiple consecutive time slots, or any combination of random and consecutive time slots as determined by the headend. No return gate enabling prybar signal is required when transmitting in a reservation time slot because the return gate device guarding the distribution branch for the transmitting remote point has been monitoring the reservation time slot assignments from the headend via the forward path. Thus, the return gate device knows when to connect the return path for the reservation time slot for which one of its remote points that will be transmitting.

If at decision step 577 it is determined that processing cease, then processing stops at step 585. Alternatively, if at decision step 577 it is determined that processing should continue, then processing continues at step 515 as previously described.

If at decision step 526, it is determined that reservation time slots are not required for the immediate transmission needs, processing continues at decision step 555. If at decision step 555, it is determined that a contention time slot will satisfy the immediate transmission need, then processing continues at step 560. Depending on the size of the short and long contention time slots, the transmitting remote point must wait for either a short or long contention time slot to transmit the desired data accompanied by a return gate enabling prybar signal. The prybar signal notifies the return gate device to connect the return path to permit the transmitted data to pass through the return gate. In the preferred embodiment, a short contention time slot is primarily used to transmit a reservation time slot request. However, a short contention time slot could be used for very small amounts of significant data other than a reservation time slot request. Nevertheless, long contention time slots are typically used for short bursts of data that do not warrant the time to obtain reservation time slots or the data carrying capacity of reservation time slots. Further, the use of contention time slots generally results in a faster transmission of a relatively small amount of data although the success of first or second attempt transmissions are never guaranteed. The lighter the return path traffic, the greater the likelihood of first or second contention time slot transmission attempt successes. Finally, the return gate enabling prybar signal can be sent in the time slot preceding the assigned reservation time slot. Sending the prybar signal in the preceding time slot has the advantages of freeing valuable data transmission space in the assigned time slot, a longer more secure prybar signal could be sent at lower power, and the return gate device receiver could be a lower cost device.

Regardless of the contention time slot being a short or long contention time slot at step 560, if the transmission is successful at decision step 568 as determined by an "acknowledgment" on the first path from the headend, then processing continues at decision step 577 as previously disclosed. Alternatively if, at decision step 568 it is determined that the contention time slot transmission of step 560 was not successful on this attempt, the remote point pauses for a random time interval at step 572 prior to retrying the transmission at step 560.

FIG. 6 illustrates the hybrid system operational steps 600 from the perspective of a return gate device 140. The processing begins at step 604 and proceeds to initialization at step 609. Initialization includes, but is not limited to, powering up the remote point device components, performing internal operational testing, and performing ranging. At step 615 the return gate device begins monitoring the forward path for reasons including, but not limited to, detecting the timing signal from the headend for synchronization, identifying the type of time slots occurring in concert with the timing signal, identifying reservation time slot assignments for remote points within the downstream distribution branch, and processing any other instructions delivered now or in the future from the headend. Substantially concurrently with the monitoring of step 615, the return path is also continuously monitored for valid return gate enabling prybar signals accompanying contention time slots at step 621.

If at decision step 628 it is determined that an assigned reservation time slot is present for a remote point within the distribution branch serviced by the immediate return gate device, processing continues at step 635. At step 635, the return path is connected for the duration of the designated time slot or slots so that the remote points reservation time slot transmission can pass through the return gate. Processing then continues at step 639.

If at decision step 628 it is determined that an assigned reservation time slot is not present, then processing continues at step 639. If at decision step 639 it is determined that a contention time slot is present or is to occur next, and a valid return gate enabling prybar signal is also determined to be present at decision step 643, then the return path is connected for the duration of the contention time slot at step 652 so that the transmitting remote point's contention time slot transmission can pass through the return gate. Processing then continues at step 657. However, if either a contention time slot is not present at step 639 or a valid prybar signal is not present at step 643, then processing continues at step 657 without connecting the return path at all.

If at decision step 657 it is determined that a network test time slot is present and the headend has given the return gate device instructions to transmit status information or other data to the headend for analysis, the processing continues at step 665 where the return gate device transmits the requested data to the headend. Processing then continues at step 668. Alternatively, if at decision step 657 it is determined that a network test time slot is not present, then processing continues to 668.

If at decision step 668 it is determined that no further processing should continue, then processing stops at step 672. If at decision step 668 it is determined that additional processing should continue, then processing continues at step 615 as previously disclosed.

One advantage of the hybrid return gate device is that the return gate therein can connect and disconnect the return path in response to a gate enabling prybar signal from a remote point within the distribution branch served by the immediate device, or in response to a reservation time slot occurring that is assigned to a remote point within the distribution branch served by the immediate device, or in response to a headend network testing command. Thus, the hybrid return gate device provides maximum flexibility to accommodate network testing, network protection, and different data transmission requirements of different transmission protocol types.

FIG. 7 illustrates the hybrid system operational steps 700 from the perspective of the headend 102. The processing begins at step 708 and proceeds to initialization at step 712. Initialization includes, but is not limited to, powering up the headend device components, performing internal operational testing, and performing network wide operational status testing. At step 718 the time slot sequence is implemented as disclosed in the text accompanying FIG. 4. The mix of time slot types is determined by the headend controller. At step 725 the time slot cycle begins and the network timing signal is broadcast on the forward path. At step 727 ranging is performed on all active devices in the network as previously discussed.

If at decision step 728 it is determined that a reservation time slot request has been received, then at least one reservation time slot is assigned at step 735 and the slot assignment is broadcast on the forward path at step 738. Processing continues at step 742.

If at decision step 728 there is no reservation time slot request present, then processing continues at step 742. If at decision step 742 it is determined that network testing is required, then, for example, remote points and/or return gate devices in the network can be polled at step 747 for status information or for network integrity and/or undesirable noise checks. If at decision step 742 there is no present need for network testing, then processing continues at step 755.

If at decision step 755 it is determined that the time slot allocation requires reconfiguring due to changing demands for the network resources, then processing continues at step 760. The need to reconfigure the time slot allocation may be predetermined in view of agreed upon times of the day for example, or determined in real time in view of overall network load and/or the type of time slots in greatest demand or shortest supply. In either case, at step 760 the time slot allocation is reconfigured and the new time slot cycle begins. If desired, the headend can convert the hybrid system to an entirely contention based system or an on demand or fixed reservation system depending on the network subscriber needs. For example, individual frames of time slots can be independently reconfigured to contain different numbers of a type of time slot to accommodate late night network testing via network test time slots when network traffic is low. Similarly, the lengths of individual time slots or time slot types can be dynamically reconfigured for longer or be increased size as needed. Also, frame lengths can be increased to include more time slots and thus accommodate more remote points. Frame lengths can also be shortened to reduce latency in transmissions. Processing then continues at step 765.

If at decision step 765 it is determined that processing should not continue, then processing stops at step 768. If at decision step 765 it is determined that processing should continue, then processing continues at step 728 as previously disclosed.

Alternative Return Gate Implementations

One alternative return gate implementation involves multiple remote points transmitting in a single time slot. Many existing return path transmission systems use non-standard channel widths, and many allow return path transmissions in bursts or packets rather than in a continuous manner. Most of the return path transmission systems use much less than the full 5–40 MHz bandwidth of the return path so it is desirable for the return path transmission system of the present invention with hybrid return gates to allow for more than one return path transmission to pass in a single time slot, provided that the transmissions are in different frequency bands for reasons of spectral efficiency. The risk in transmitting multiple return path transmissions in one time slot on different frequency bands is that one of the transmitting remote points could allow noise into the return path that would disrupt not only its own return path signal but the return path signals of other remote points transmitting on other frequencies in the same time slot. This problem can be solved by only allowing "clean" groups of remote points to share the same time slot. Preferably, all remote points in a given "clean" group reside in the same distribution branch. Thus, when a remote point in a given distribution branch develops a problem such as ingress or a spurious-generating transmitter, the remote point is assigned to its own time slot until repairs can be made. The identity of the remote point having the problem can be discovered either by network monitoring functions as previously discussed, or by systematically isolating parts of the network until the problem area is located as previously discussed.

An additional alternative return gate implementation involves return gates located in the headend. As a practical matter, the electrical output from return fiber receivers serving different branches of a network are now sometimes combined at the headend. This has the effect of combining noise, as well as signals in the manner described previously. However, the difference is that the combining occurs far upstream at the headend rather than in the field. Essentially, the result of combining output from return fiber receivers is that multiple distribution branches in the network become a single distribution branch. Combining distribution branches at the headend is done for economic reasons since the cost of each return fiber receiver may be very high and therefore it is more cost effective for each return fiber receiver to service as many remote points in as many distribution branches as is possible. If service penetration is low, as it is in the early days of service deployment, the active remote points in the network may be spread over several distribution branches and return gates in the headend may be used to isolate the return path of a distribution branch for only one distribution branch at a time. This return gate deployment is a similar to the application of the secondary return gates, 144 and 145 illustrated in FIG. 1. If the number of remote points serviced by a single return fiber is low, then the entire fiber plus coaxial plant may be considered a single distribution branch, and the return gates may be deployed entirely at the headend.

SUMMARY

The present invention is a hybrid return gate system that facilitates control of a bi-directional cable network return path that suppresses undesirable energy in the network's return path from adversely affecting the entire network, while facilitating reservation and contention type transmissions. The apparatus to implement the hybrid return gate system are disclosed herein and are individually known and widely available in the cable industry from manufacturer/distributors including, but not limited to, General Instruments, Phillips Broadband, Eagle, and Scientific Atlanta. Although specific embodiments are disclosed for example herein, it is expected that persons skilled in the art can and will design alternative hybrid return gate systems that are within the scope of the following claims either literally or under the Doctrine of Equivalents.

What is claimed is:

1. A hybrid return gate system for suppressing undesirable energy in a network having a bi-directional communication path comprising a first direction and a second direction between a headend and a plurality of remote points, said system comprising:

means for disconnecting said second direction of said bi-directional communication path;

first means for connecting said second direction of said bi-directional communication path on occurrence of at least one reservation time slot that is dynamically assigned by a command from said headend in response to a reservation time slot request submitted by any one of said plurality of remote points; and second means for connecting said second direction of said bi-directional communication path on a contention basis in response to a request from any one of said plurality of remote points.

2. A system according to claim 1 including:

a return gate in said second direction of said bi-directional communication path shared by said means for disconnecting, said first means for connecting, and said second means for connecting.

3. A system according to claim 2 including:

a plurality of return gates in said second direction of said bi-directional communication path; and at least one of said plurality of return gates dedicated to a corresponding one of said plurality of remote points.

4. A system according to claim 2 including:

a plurality of return gates in said second direction of said bi-directional communication path;

at least one of said plurality of return gates dedicated to a corresponding one of said plurality of remote points within one of a plurality of distribution branches in said network; and at least one of said plurality of return gates dedicated to one of said plurality of distribution branches in said network.

5. A system according to claim 2 including:

a plurality of return gates in said second direction of said bi-directional communication path;

at least one of said plurality of return gates in a primary position dedicated to one of a plurality of distribution branches in said network; and at least one of said plurality of return gates in a secondary position dedicated to at least one of said plurality of distribution branches in said network.

6. A system according to claim 1 including:

means for dynamically defining a series of cyclically reoccurring time slots selected from at least one of the group consisting of: at least one contention time slot, at least one reservation time slot, and at least one network time slot; and means for broadcasting information about said series of cyclically reoccurring time slots to facilitate transmitting in said second direction of said bi-directional communication path.

7. A system according to claim 1 including:

third means for connecting said second direction of said bi-directional communication path exclusively with said first means for connecting.

8. A system according to claim 1 including:

third means for connecting said second direction of said bi-directional communication path exclusively with said second means for connecting.

9. A system according to claim 1 wherein said first means for connecting includes:

means for transmitting said reservation time slot request in a contention time slot in said second direction by a requesting one of said plurality of remote points means means for receiving a reservation time slot assignment from said headend by said requesting one of said plurality of remote points and a return gate device controlling said second direction on behalf of said requesting one of said plurality of remote points; and means for transmitting a data packet in said reservation time slot assignment in said second direction by said requesting one of said plurality of remote points in conjunction with said return gate device connecting said second direction of said bi-directional communication path for a duration of said reservation time slot assignment.

10. A system according to claim 9 including:

means for accompanying said data packet in said reservation time slot assignment with a request for at least one additional reservation time slot assignment for said requesting one of said plurality of remote points.

11. A system according to claim 1 wherein said second means for connecting includes:

means for generating a gate enabling prybar signal by a transmitting one of said plurality of remote points;

means for transmitting a data packet in a contention time slot substantially concurrently with said gate enabling prybar signal in said second direction of said bi-directional communication path from said transmitting one of said plurality of remote points;

means for receiving said gate enabling prybar signal in a return gate device capable of connecting said second direction of said bi-directional communication path;

means for connecting said second direction of said bi-directional communication path by said return gate device in response to said gate enabling prybar signal to allow said data packet to pass through said return gate device; and means for disconnecting said second direction at an end of said contention time slot.

12. A hybrid method for suppressing undesirable energy in a network having a first direction and a second direction in a bi-directional communication path between a headend and a plurality of remote points, said method comprising:

disconnecting said second direction of said bi-directional communication path;

first step of connecting said second direction of said bi-directional communication path on occurrence of at least one reservation time slot dynamically assigned by a command from said headend in response to a reservation time slot request submitted by any one of said plurality of remote points; and second step of connecting said second direction of said bi-directional communication path on a contention basis in response to a command from any one of said plurality of remote points.

13. A method according to claim 12 including:

dynamically defining a series of reoccurring time slots selected from at least one of a group consisting of: at least one contention time slot and at least one reservation time slot; and broadcasting said series of reoccurring time slots for transmissions in said second direction of said bi-directional communication path.

14. A method according to claim 12 wherein said first step of connecting includes:

a first set of steps comprising:
  transmitting a reservation time slot request in a contention time slot by a requesting one of said plurality of remote points;
  receiving a reservation time slot assignment from said headend by said requesting one of said plurality of remote points; and
  transmitting a data packet in said reservation time slot assignment by said requesting one of said plurality of remote points;

a second set of steps occurring in concert with said first set of steps, comprising:
  detecting said reservation time slot request in said headend from said requesting one of said plurality of remote points; and
  broadcasting said reservation time slot assignment in said first direction from said headend across said network;

a third set of steps occurring in concert with said first set of steps and said second set of steps, comprising:
  monitoring said first direction of said bi-directional communication path with a return gate device;
  detecting said reservation time slot assignment in said first direction with said return gate device; and
  connecting said second direction of said bi-directional communication path with said return gate device at an occurrence of said reservation time slot assignment for a duration of said reservation time slot assignment.

15. A method according to claim 14 including:

accompanying said data packet in said reservation time slot assignment with a request for at least one additional reservation time slot.

16. A method according to claim 12 wherein said second step of connecting includes:

a first set of steps comprising:
  generating a gate enabling prybar signal by a transmitting one of said plurality of remote points;
  transmitting a data packet in a contention time slot substantially concurrently with said gate enabling prybar signal on said second direction of said bi-directional communication path from said transmitting one of said plurality of remote points;
  determining if said data packet was successfully transmitted on said second direction of said bi-directional communication path; and
  retransmitting said data packet if said data packet did not transmit successfully on said second direction of said bi-directional communication path;

a second set of steps occurring in concert with said first set of steps, comprising:
  detecting said return gate enabling prybar signal in said second direction of said bi-directional communication path; and
  connecting said second direction of said bi-directional communication path for a duration of said contention time slot.

17. A method according to claim 12 including:

operating said second direction of said bi-directional communication path on a contention access only basis according to said second step of connecting said second direction.

18. A method according to claim 12 including:

operating said second direction of said bi-directional communication path on a reservation access only basis according to said first step of connecting said second direction.

19. A return gate system for suppressing undesirable energy in a network having a first direction and a second direction in a bi-directional communication path between a headend and a plurality of remote points, said system comprising:

means for dynamically defining a series of reoccurring time slots selected from at least one of the group consisting of: at least one contention time slot and at least one reservation time slot;

means for restricting a transmission of a signal in said second direction of said bi-directional communication path comprising:
  means for transmitting a reservation time slot assignment in said first direction of said bi-directional communication path from said headend to said plurality of remote points;
  means for transmitting said signal in said second direction in a reservation time slot assigned to one of said plurality of remote points by said headend;
  first means for connecting said second direction of said bi-directional communication path in response to an occurrence of said reservation time slot assigned to one of said plurality of remote points that resides in a part of said network controlled by said first means for connecting;
  means for disconnecting said second direction of said bi-directional communication path at an end of said reservation time slot;
  second means for connecting said second direction of said bi-directional communication path in response to a return gate enabling signal in said second direction of said bi-directional communication path transmitted by a remote point that resides in a part of said network controlled by said second means for connecting; and
  means for disconnecting said second direction of said bi-directional communication path at an end of said occurrence of said contention time slot.

20. A return gate system according to claim 19 wherein said means for dynamically defining includes:

means for defining at least one contention only time slot; and means for operating said network with contention only network communications in said second direction of said bi-directional communication path.

21. A return gate system according to claim 19 wherein said means for dynamically defining includes:

means for defining at least one reservation request contention time slot;

means for defining at least one reservation time slot; and means for operating said network with reservation only network communications in said second direction of said bi-directional communication path.

* * * * *